US012746554B2

(12) United States Patent
Salinas Hudson

(10) Patent No.: US 12,746,554 B2
(45) Date of Patent: Sep. 29, 2026

(54) MILL DISCHARGE GRATE HAVING DYNAMIC VARIABLE SIEVE OPENINGS

(71) Applicant: FLSmidth A/S, Valby (DK)

(72) Inventor: Mauricio Salinas Hudson, Viña del Mar (CL)

(73) Assignee: FLSmidth A/S (DK)

( * ) Notice: Subject to any disclaimer, the term of this patent is extended or adjusted under 35 U.S.C. 154(b) by 219 days.

(21) Appl. No.: 18/274,201

(22) PCT Filed: Jan. 25, 2022

(86) PCT No.: PCT/IB2022/050611

§ 371 (c)(1),
(2) Date: Jul. 25, 2023

(87) PCT Pub. No.: WO2022/157741

PCT Pub. Date: Jul. 28, 2022

(65) Prior Publication Data

US 2024/0316567 A1 Sep. 26, 2024

Related U.S. Application Data

(60) Provisional application No. 63/141,228, filed on Jan. 25, 2021.

(51) Int. Cl.
*B02C 17/18* (2006.01)

(52) U.S. Cl.
CPC ................................ *B02C 17/1855* (2013.01)

(58) Field of Classification Search
CPC ........................ B02C 17/1855; B02C 17/1835
See application file for complete search history.

(56) References Cited

U.S. PATENT DOCUMENTS 3,219,284 A * 11/1965 Son Fahlstrom ..... B01F 35/181 241/70
3,894,696 A * 7/1975 Jonsson .............. B02C 17/1855 241/70
2007/0012807 A1 * 1/2007 Hunter .................... B02C 17/14 241/171

FOREIGN PATENT DOCUMENTS

CN 110237902 A 9/2019
WO 20110130781 A1 10/2011

OTHER PUBLICATIONS

International Search Report and Written Opinion dated May 9, 2022, 12 pages.

* cited by examiner

*Primary Examiner* — Mohammed S. Alawadi
(74) *Attorney, Agent, or Firm* — Jeffrey A. Sharp

(57) ABSTRACT

A discharge grate (200) for an internal discharge end (3) of a mill (1) may be characterized in that it has at least one dynamic variable sieve opening (206) defined between two adjacent floating screen bars (202). The floating screen bars (202) may be configured to a least temporarily move with respect to one another and/or with respect to a holding frame (201) receiving the floating screen bars (202). Temporary expansion of the at least one dynamic variable sieve opening (206) may permit undersized media to pass to the discharge chute (8) and reduce or eliminate pegging.

15 Claims, 9 Drawing Sheets

MILL DISCHARGE GRATE HAVING DYNAMIC VARIABLE SIEVE OPENINGS

FIELD OF THE INVENTION

The present invention relates to a unique discharge grate 200 for use within a discharge end 3 of a mill 1. The discharge grate 200 comprises a number of movable (i.e., "floating") screen bars 202, which enable dynamic variable sieve openings 206 of the discharge grate 200 to dynamically expand and contract as necessary to accommodate passage of media 4 and pulverized material 5 to a discharge chute 8 whilst discouraging occurrences of pegging.

BACKGROUND TO THE INVENTION

Reference to background art herein is not to be construed as an admission that such art constitutes common general knowledge in the arts.

Turning to FIGS. 1-5, discharge grates 2 have been known to be used within discharge ends 3 of mills 1 (e.g., SAG mills, ball mills, rod mills) for decades. During comminution operations, undersized media 4 can become stuck in fixed sieve openings 6. Due to heat, pressure, and/or force, the media 4 can become wedged or welded into sieve openings 6 (as suggested in FIG. 4). The lodged media 4 reduces the overall open area of the discharge grate 2 defined by the fixed sieve openings, thus leading to further occlusion of the fixed sieve openings by pulverized material. Eventually, the open area of the discharge grates 2 can become so reduced that the discharge grates 2 must be removed and replaced. It is thus, a long-felt need to provide a more robust and pegging-resistant mill discharge grate 2 design.

FIG. 1 depicts a discharge end 3 of a mill 1 shortly after re-commissioning (photo taken from inside the mill 1), wherein conventional discharge grates 2 have been recently replaced. It can be seen from this figure that very little pegging and/or occlusion is present at discharge grates 2, and that flow of pulverized material 5 is quite free to flow through fixed sieve openings 6.

FIG. 2 depicts a discharge end 3 of a mill 1 shortly after de-commissioning (photo taken from inside the mill 1), wherein conventional discharge grates 2 have experienced pegging/occlusion and need replacing. In particular, one of the discharge grates 2 and lifter bars 9 have been removed from a mount 7, thus exposing a discharge channel 8 below. It can be seen from this figure that a significant amount of pegging by media 4 and/or occlusion by pulverized material 5 is present at discharge grates 2. Thus, a flow of pulverized material 5 through discharge grates 2 and into discharge chute is significantly hindered due to reduced open area of fixed sieve openings 6. FIG. 3 shows a close-up portion of FIG. 3.

The present invention aims to improve upon existing mill discharge grate devices by incorporating movable i.e., "floating" screen bars that can temporarily expand to allow passage of media 4 and/or pulverized material 5, in turn, leading to improved performance, reduced pegging, increased flexibility, and modularity.

OBJECTS OF THE INVENTION

It is an aim of embodiments of the invention to provide an improved discharge grate 2 for a mill 1 which overcomes or ameliorates one or more of the disadvantages or problems described above, or which at least provides a useful alternative to conventional discharge grate apparatus.

A particular aim of embodiments is to provide a discharge grate 2 which exhibits better wear life, reduced pegging occurrences, reduced sieve opening occlusion rate, and improved screening performance over conventional discharge grates 2.

Other preferred objects of the present invention will become apparent from the following description.

SUMMARY OF INVENTION

Embodiments of a dynamic variable opening discharge gate (200) are disclosed.

A discharge grate (200) for an internal discharge end (3) of a mill (1) may comprise open surface area for passing pulverized material (5) from the inside of the mill (1) to a discharge chute (8). The discharge grate (200) may further comprise closed area for discouraging passage of grinding media (4) from the mill (1). The closed area may help maintain the grinding media (4) and unpulverized material within the mill (1). The discharge grate (200) may be characterised in that it may further comprise at least one dynamic variable sieve opening (206). The dynamic variable sieve opening (206) may be defined between two adjacent floating screen bars (202). The floating screen bars (202) may be configured to a least temporarily move with respect to one another and/or with respect to a holding frame (201) receiving the floating screen bars (202).

According to some embodiments, the discharge grate (200) may comprise a resilient member (213). The resilient member may be positioned between each of the floating screen bars (202) and the holding frame (201), without limitation. The resilient member (213) may comprise a material which is configured to elastically deform. For example, the material of the resilient member (213) may comprise a polymeric material, without limitation.

According to some embodiments, the holding frame (201) may comprise receiving openings (214). The receiving openings (214) may be configured for receiving floating screen bars (202). For example, a floating screen bar (202) may be received within a respective receiving opening (214). Receiving openings (214) may be sized larger than the floating screening bars (202). In addition to a floating screen bar (202) a receiving opening (214) may be configured for receiving a resilient member (213), without limitation.

According to some embodiments, each (or at least one) of the receiving openings (214) may comprise a first cutout (214*d*) and a second cutout (214*e*). The second cutout (214) may be positioned across from the first cutout (214*d*).

According to some embodiments, each (or at least one) of the floating screen bars (202) may comprise a first cutout (202*d*) and a second cutout (202*e*) positioned opposite the first cutout (202*d*). The at least one dynamic variable sieve opening (206) may, in some embodiments, be defined between a first cutout (202*d*) of a floating screen bar (202) and a first cutout (214*d*) of a receiving opening (214), without limitation.

According to some embodiments, a lifter (203) may be provided to the discharge grate (200). The discharge grate (200) may comprise a channel (211) (e.g., in its base (204)), for receiving a protrusion (218) of the lifter (203), without limitation.

According to some embodiments, the discharge grate (200) may comprise at least one transverse securing bar (205). The at least one transverse securing bar (205) may extend across one or more floating screen bars (202). For example, a transverse securing bar (205) may extend generally orthogonally across a plurality of screen bars (202). A lower surface of a transverse securing bar (205) may be positioned above an upper surface of a floating screen bar (202).

The at least one transverse securing bar (205) may be secured by two side supports (212). The side supports (212) may extend from and/or form an integral portion with a base (204). In some embodiments, the discharge grate (200) may comprise a baseplate (207). The baseplate (207) may provide a backing portion of the base (204), without limitation. The baseplate (207) may comprise a large pass-through aperture (215). The large pass-through aperture (215) may be positioned below the floating screen bars (202). Edge portions of the large pass-through aperture (215) may optionally support surfaces of one or more floating screen bars (202).

In some embodiments, the discharge grate (200) may comprise a recessed support lip (210). For example, two recessed support lips (210) may be provided to opposing sides of a base (204) portion. A recessed support lip (210) may be configured for supporting a lifter (203) or portion thereof, without limitation.

A method of lining an internal discharge end (3) surface of a mill (1) suitable for comminuting ore is further disclosed. The method, according to some embodiments, may comprise the step of providing a discharge grate (200) as described above. The method may further comprise the step of mounting the discharge grate (200) over a discharge chute (8) of the mill (1). The method may further comprise the step of securing the discharge grate (200) to a mount (7) provided at the discharge end (3), without limitation.

A method of comminuting ore is also disclosed. The method may comprise the step of providing a mill (1) suitable for comminuting ore and having a discharge grate (200) as described above. The discharge grate (200) may be, for example, provided to an internal discharge end (3) surface of the mill (1). The discharge grate (200) may be secured to a mount (7) and extending over a discharge chute (8): The method of comminuting ore may comprise the step of filling the mill (1) with media (4) and material to be pulverized. The method of comminuting ore may further comprise the step of operating the mill (1) by rotating a portion thereof containing the media (4) and material to be pulverized. The method of comminuting ore may further comprise the step of allowing the at least one dynamic variable sieve opening (206) of the discharge grate (200) to expand, thus allowing pulverized material (5) and/or undersized media (4) to pass therethrough.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures.

FIG. 1 shows a photo of newly-mounted discharge grates 2 at a discharge end 3 of a mill 1. The photo is taken inside of the mill 1 looking towards the discharge end 3 of the mill 1.

FIG. 2 is a second photo, also taken inside of the mill 1 looking towards the discharge end 3 of the mill 1. The figure shows one discharge grate 2 being removed from a mount 7, exposing a discharge chute 8 below. As can be gleaned from the figure, pulverized material 5 and/or grinding media 4 which has been reduced in size can blind openings in the discharge grates 2, thus preventing or hindering material from within the mill from egress into the discharge chute 8 below each discharge grate 2.

FIGS. 3 and 4 are additional photos exhibiting occlusion of fixed sieve openings 6 within a conventional discharge grate 2.

DETAILED DESCRIPTION OF THE DRAWINGS

Figure 1:
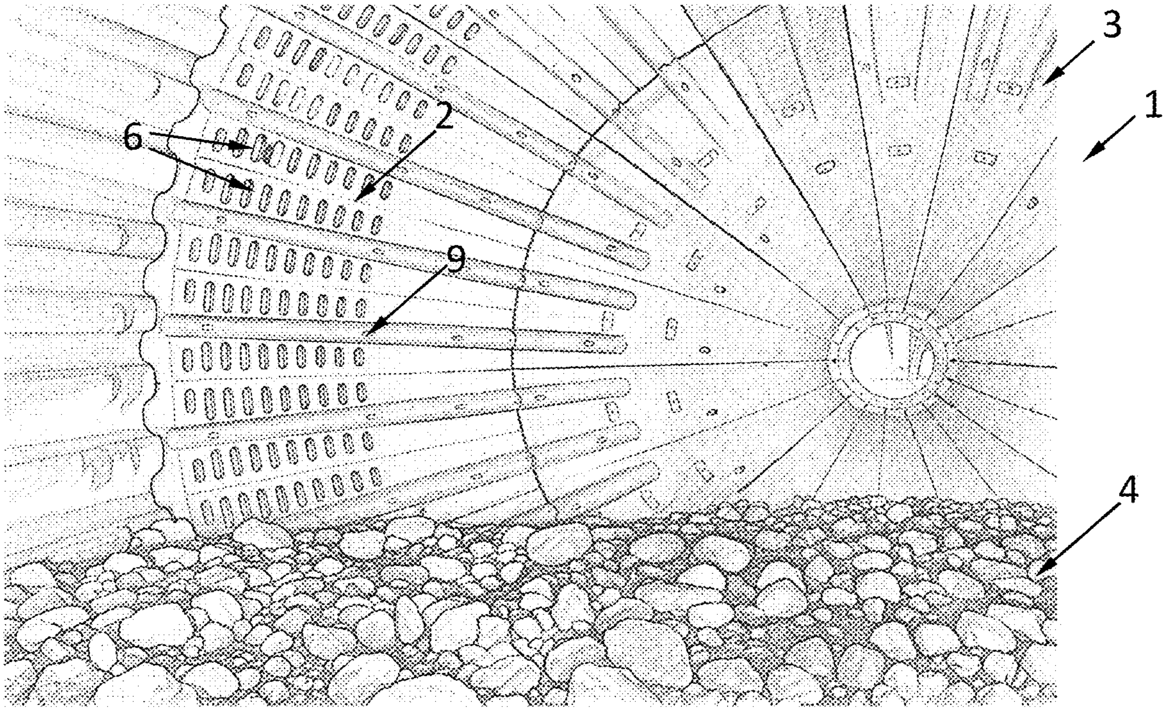
FIGS. 1-4 are representative images illustrating disadvantages associated with conventional discharge grates 2.
Figure 2:
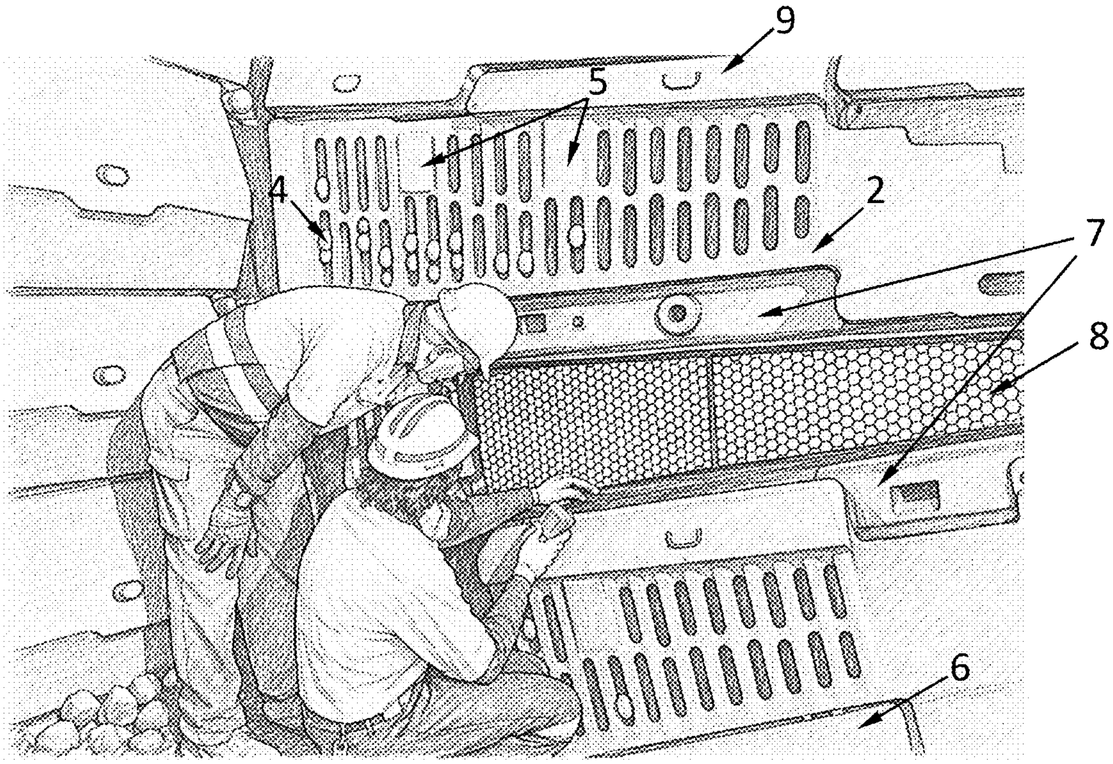
Figure 3:
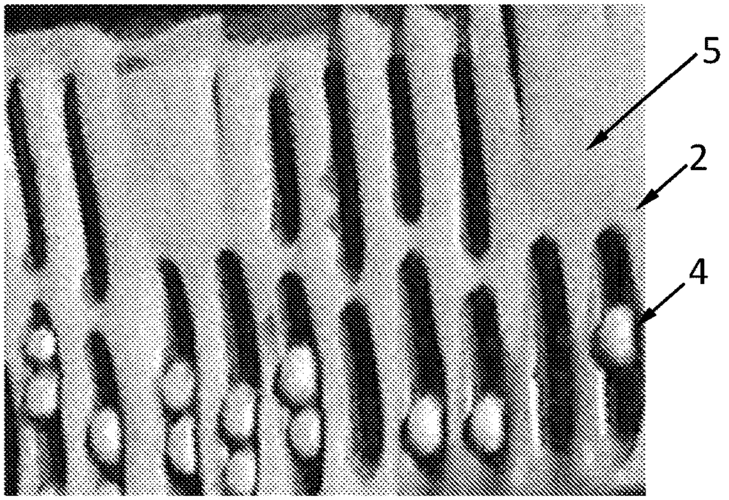
Figure 4:
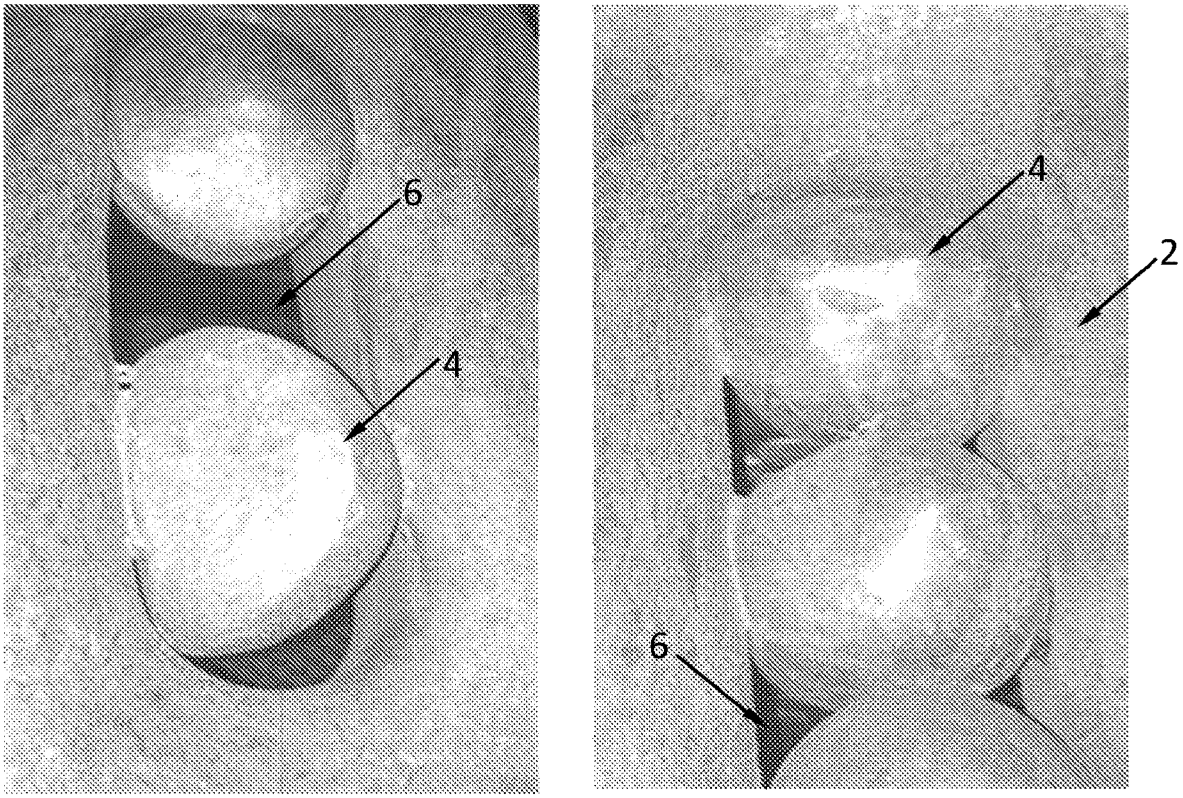
Figure 5:
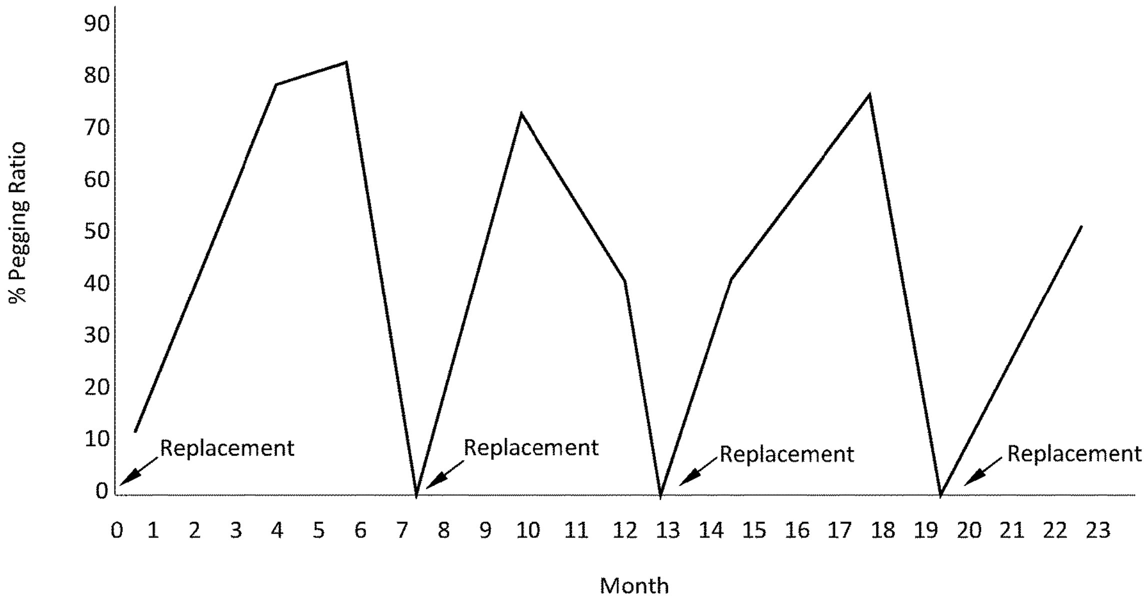
FIG. 5 suggests a typical cycle for replacing conventional discharge grates 2 of a mill 1. Typically, the % pegging ratio spikes after replacement of discharge grates 2, but as time progresses, pegging occurs. To ensure that enough material can pass through the discharge grates 2, the occluded discharge grates 2 are replaced periodically.

As shown in FIGS. 1-4, conventional discharge grates 2 are prone to pegging and occlusion by pulverized material. Embodiments described herein aim to improve the overall lifespan and effectiveness of conventional discharge grates 2 and address the shortcomings of state-of-the art mill discharge grate devices.

A mill 1 configured for comminuting ore, such as a ball mill, semi-autogenous grinding (SAG) mill, rod mill, or the like may comprise a number of dynamic variable opening discharge grates 200 as shown and described herein. Each dynamic variable opening discharge grate 200 may be secured to a mount 7 within a mill 1, and extend over a discharge chute 8 as conventionally done. Collectively, the dynamic variable opening discharge grates 200 may form an internal surface portion of mill discharge end 3 of a mill 1.

The dynamic variable opening discharge grate 200 described and illustrated herein are provided merely as examples to which the invention of the claims may be applied. The specification does not suggest that the invention of the claims is limited to or applies only to the particular dynamic variable opening discharge grate 200 shown and described herein.

Turning now to FIGS. 6-15, a dynamic variable opening discharge grate 200 according to embodiments of the invention may comprise one or more holding frames 201. Each holding frame 201 may be configured to receive a number of floating screen bars 202. The floating screen bars 202 may each be received within a respective receiving opening 214 of the holding frame 201 as depicted. Each receiving opening 214 may comprise a first end 214*a* and a second end 214*b*. As depicted, according to some non-limiting embodiments a receiving opening 214 may further comprise a middle portion 214*c*, a first cutout 214*d*, a second cutout 214*e*, a third cutout 214*f*, and/or a fourth cutout 214*g*, without limitation. Cutouts 214*d*-214*g* may each form portions of dynamic (i.e., expanding/contracting) variable sieve openings 206 as will be described in further detail below.

Figure 11:
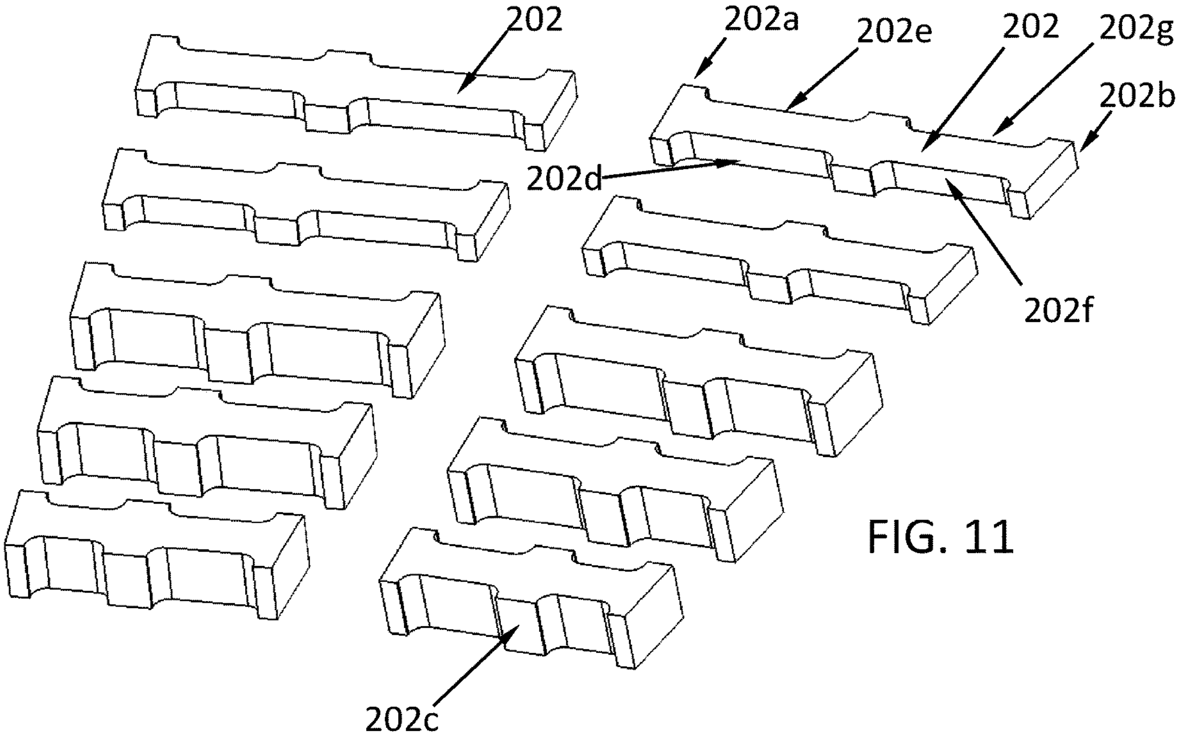
FIG. 11 shows floating screen bars 202 according to some non-limiting embodiments of the invention. The floating screen bars 202 are configured to be received within the receiving openings 214 depicted in FIG. 10.

Each floating screen bar 202 may comprise a first end 202*a* and a second end 202*b*. As best depicted in FIG. 11, a floating screen bar 202 may be bone-shaped, wherein the first 202*a* and/or second 202*b* ends are wider or larger in a transverse direction than central portions of the floating screen bar 202, without limitation. In some embodiments, as depicted, a middle portion 202*c* of the floating screen bar 202 may also be widened as the first 202*a* and second 202*b* ends are, without limitation. If this is the case, a floating screen bar 202 according to embodiments of the invention may comprise a first cutout 202*d*, a second cutout 202*e*, a third cutout 202*f*, and a fourth cutout 202*g*, without limitation. These cutouts 202*d*, 202*e*, 202*f*, 202*g* may form portions of a dynamic (i.e., expanding/contracting) variable sieve opening 206 of the dynamic variable opening discharge grate 200.

Figure 6:
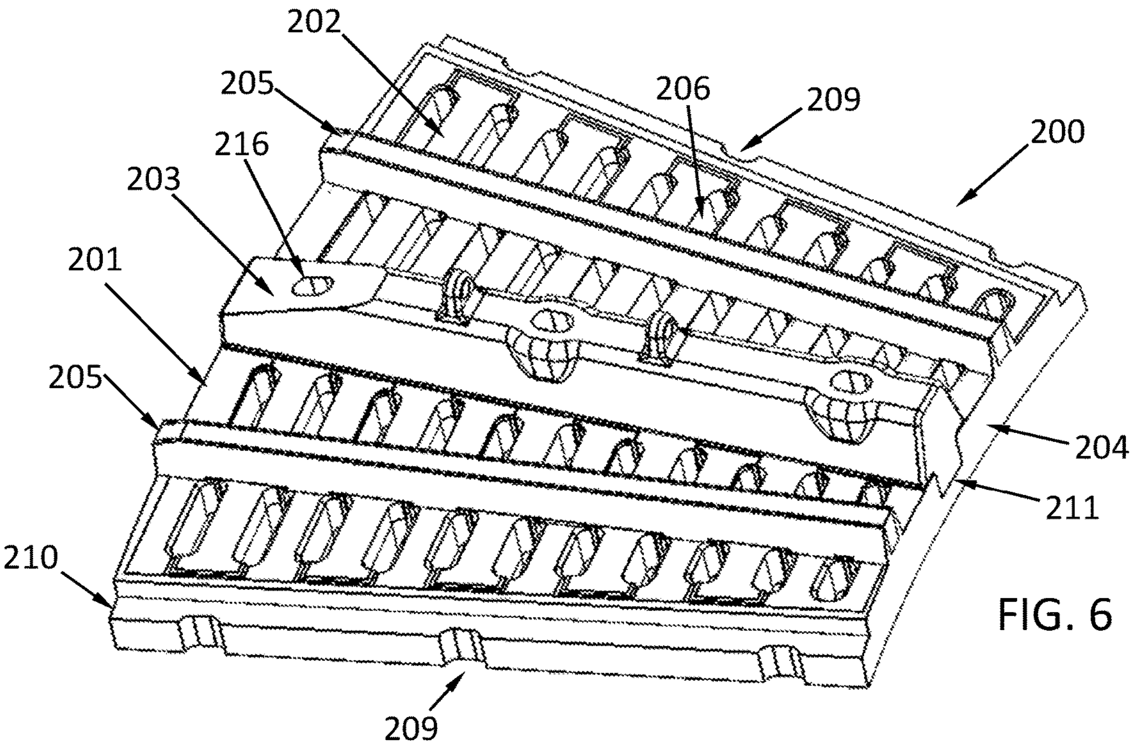
FIG. 6 shows an upper isometric view of a dynamic variable opening discharge grate 200 according to embodiments of the invention.
Figure 7:
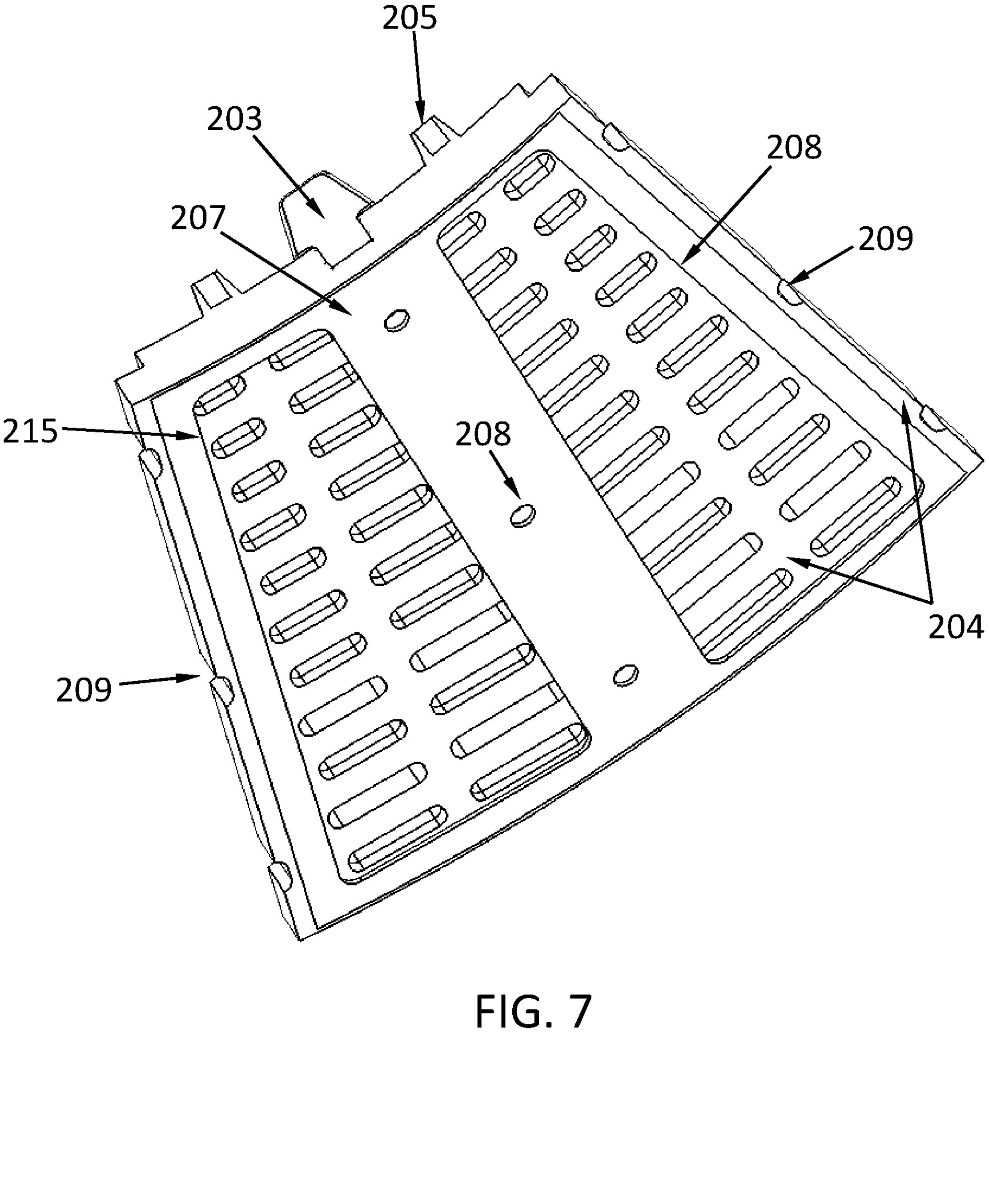
FIG. 7 shows a lower isometric view of the dynamic variable opening discharge grate 200 shown in FIG. 6.
Figure 8:
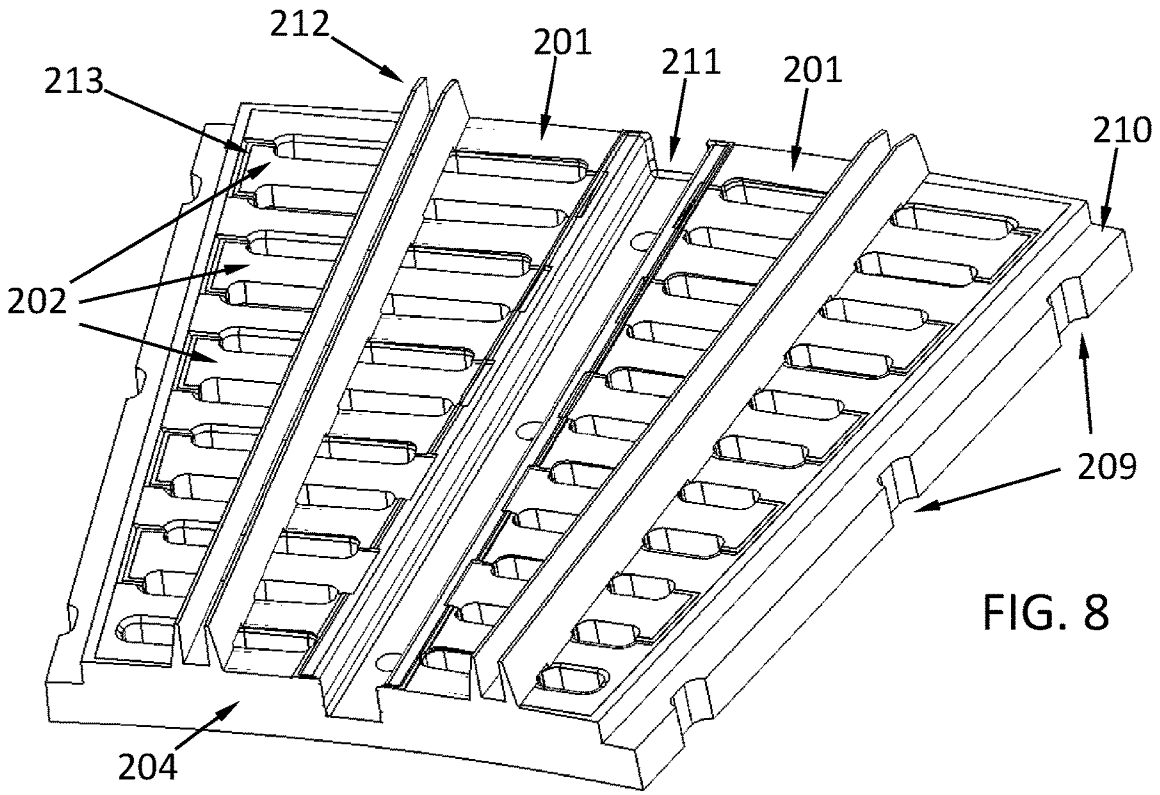
FIG. 8 shows the dynamic variable opening discharge grate 200 shown in FIGS. 6 & 7 without a lifter 203 or transverse securing bars 205.
Figure 9:
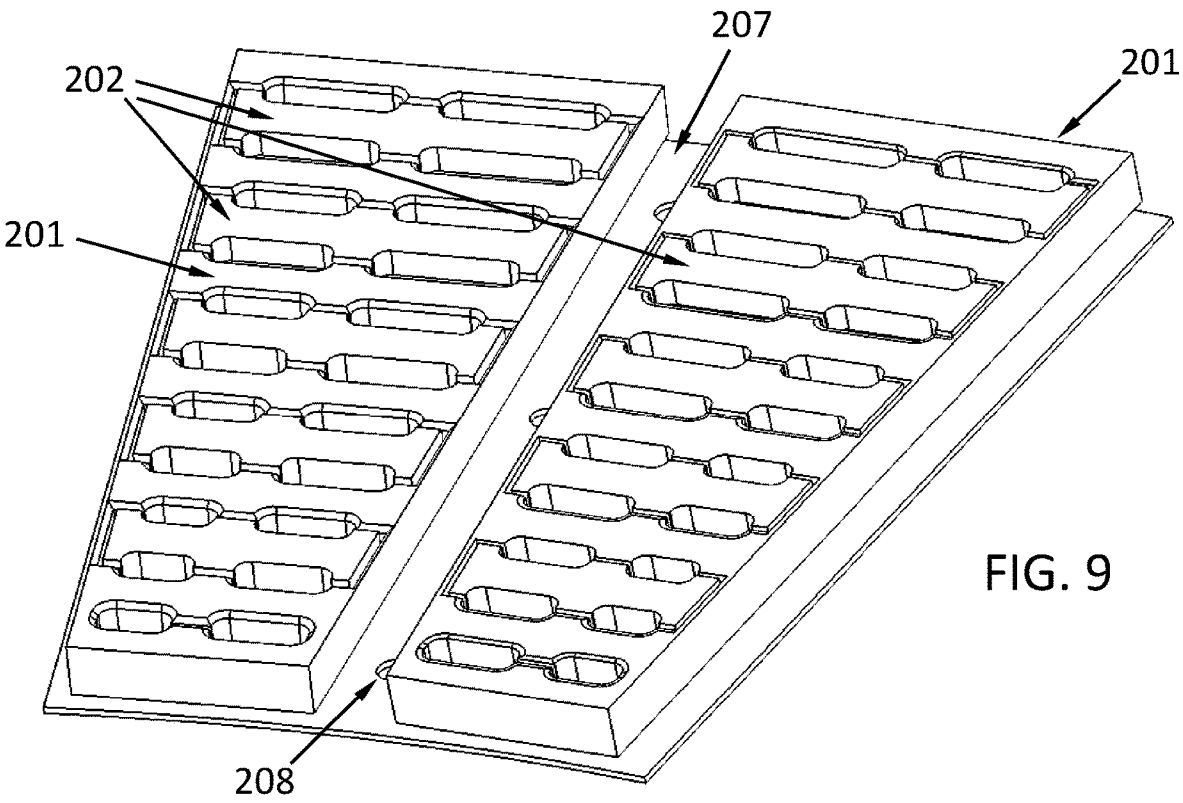
FIG. 9 shows a baseplate 207, holding frames 201, and floating screen bars 202 found within the dynamic variable opening discharge grate 200 shown in FIGS. 6-8.
Figure 10:
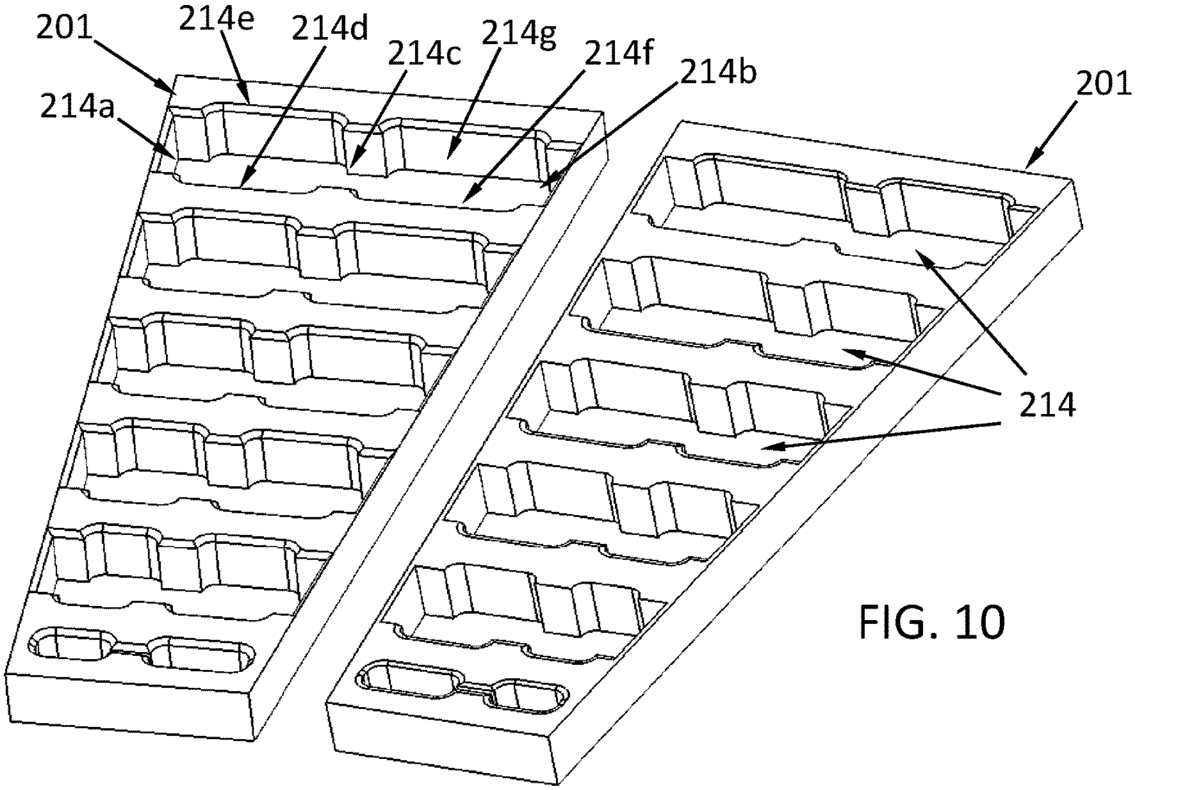
FIG. 10 shows holding frames 201 found in FIGS. 6-9, without floating screen bars 202. In this regard, receiving openings 214 of the holding frames 201 can be seen more clearly.
Figure 13:
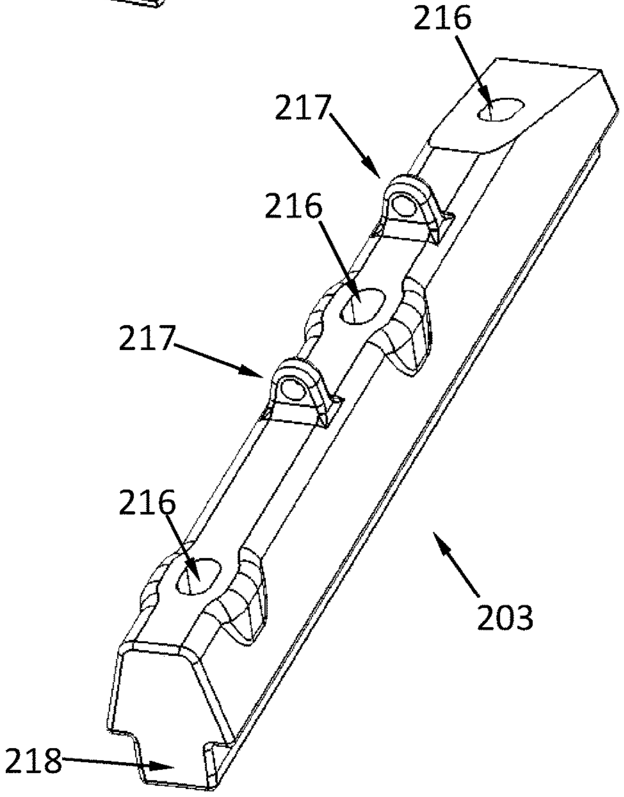
FIG. 13 shows the lifter bar 203 of the dynamic variable opening grate 200 shown in FIGS. 6 and 7.
Figure 14:
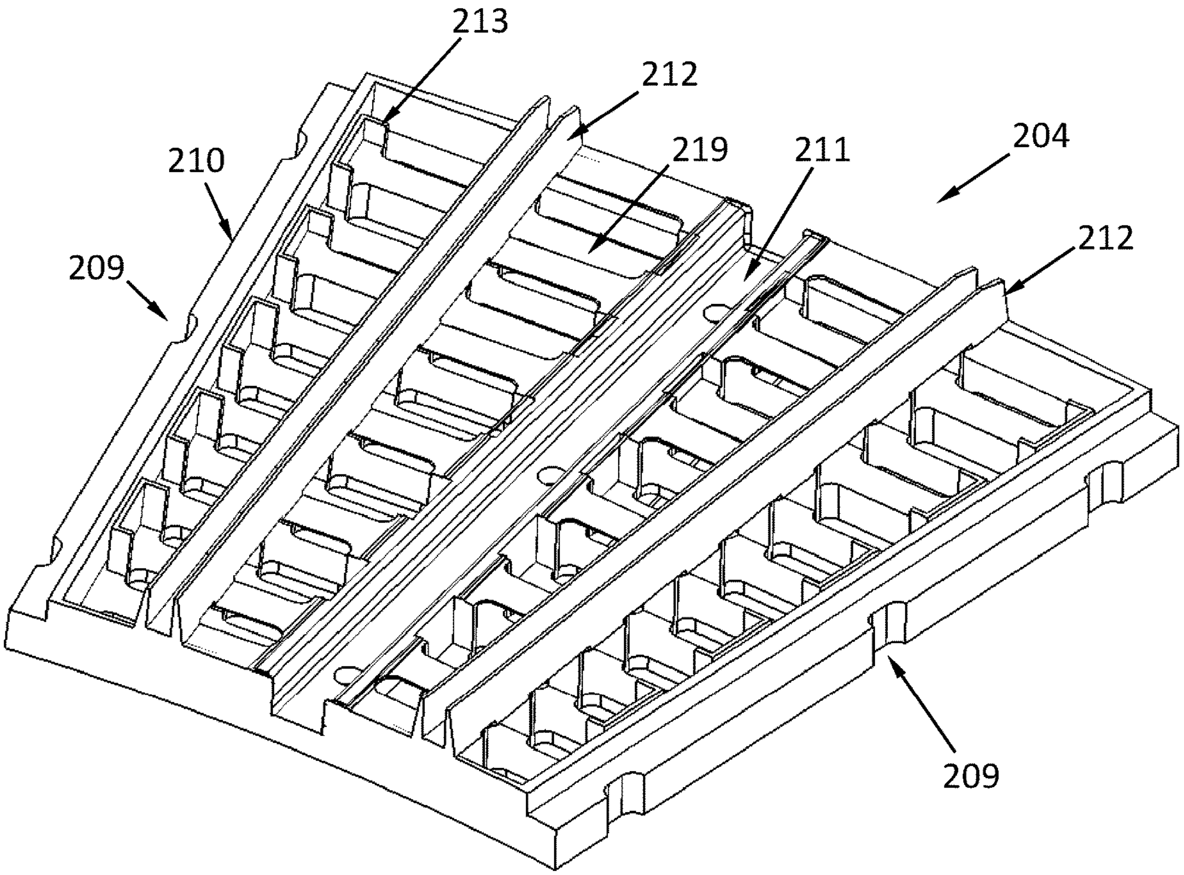
FIG. 14 shows features of polymeric base 204 more clearly. The base 204 may comprise a rubber or polyurethane which may be moulded over other components of the dynamic variable opening grate 200, without limitation. Portions of the base, such as resilient buffers 213, may comprise a softer material than other portions of base 204.

The dynamic variable opening discharge grate 200 may further comprise a lifter 203 extending across its central portion as illustrated. The lifter 203, as best seen in FIG. 13, may comprise one or more fastening bores 216 for securing the lifter 203 to a mount 7 or other components of the dynamic variable opening discharge grate 200. Lifter 203 may also comprise one or more lifting features 217 (e.g., hook eye) for safety and ease of installation/removal from a dynamic variable opening discharge grate 200 and/or from the discharge end 3 of mill 1. Lifter 203 may comprise a lower protrusion 218 extending along a portion or entirety of its length for being complimentarily received in a channel 211 of the dynamic variable opening discharge grate 200 as best depicted in FIGS. 6 & 7.

Figure 12:
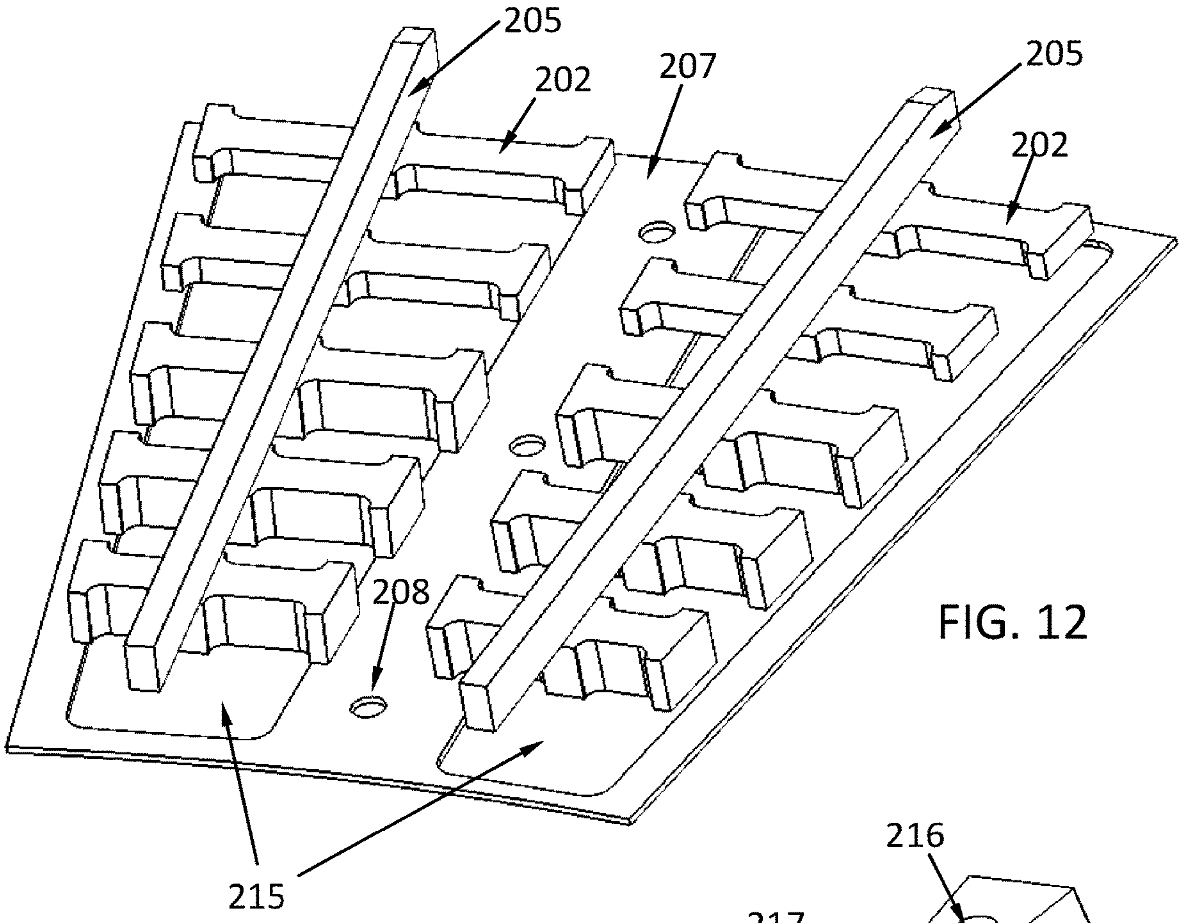
FIG. 12 shows only baseplate 207, floating screening bars 202, and transverse securing bars 205 of the dynamic variable opening grate 200 according to FIGS. 6-11. In this regard, large pass-through apertures 215 provided to baseplate 207 can be seen more clearly.

As best depicted in FIG. 12, one or more transverse securing bars 205 may be provided to extend over the floating screen bars 202 and hold them captive. As shown, a plurality of (i.e., two) transverse securing bars 205 extend over two adjacent rows of floating screen bars 202. The transverse securing bars 205 may further serve as wear members similar to lifter bar 203. The transverse securing bars 205 may be received in channels defined by side supports 212 of a base 204. Side supports 212 are most clearly depicted in FIG. 14.

A baseplate 207 may be provided below the floating screen bars 202 as suggested in FIG. 12. The baseplate 207 may serve to stiffen base 204, and provide a rigid mounting surface for mounting the dynamic variable opening discharge grate 200 to a mount 7, without limitation. Baseplate 207 may serve to prevent flexing of base 204 over discharge chutes 8 upon impacts within a mill 1, without limitation. The baseplate 207 may serve to support end portions (i.e., first 202*a* and second 202*b* ends of floating screen bars 202), without limitation. The baseplate 207 may comprise a number of baseplate mounting holes 208 for receiving fasteners. The fasteners received by baseplate mounting holes 208 may be the same fasteners extending through fastening bores 216 of lifter 203, without limitation.

Figure 15:
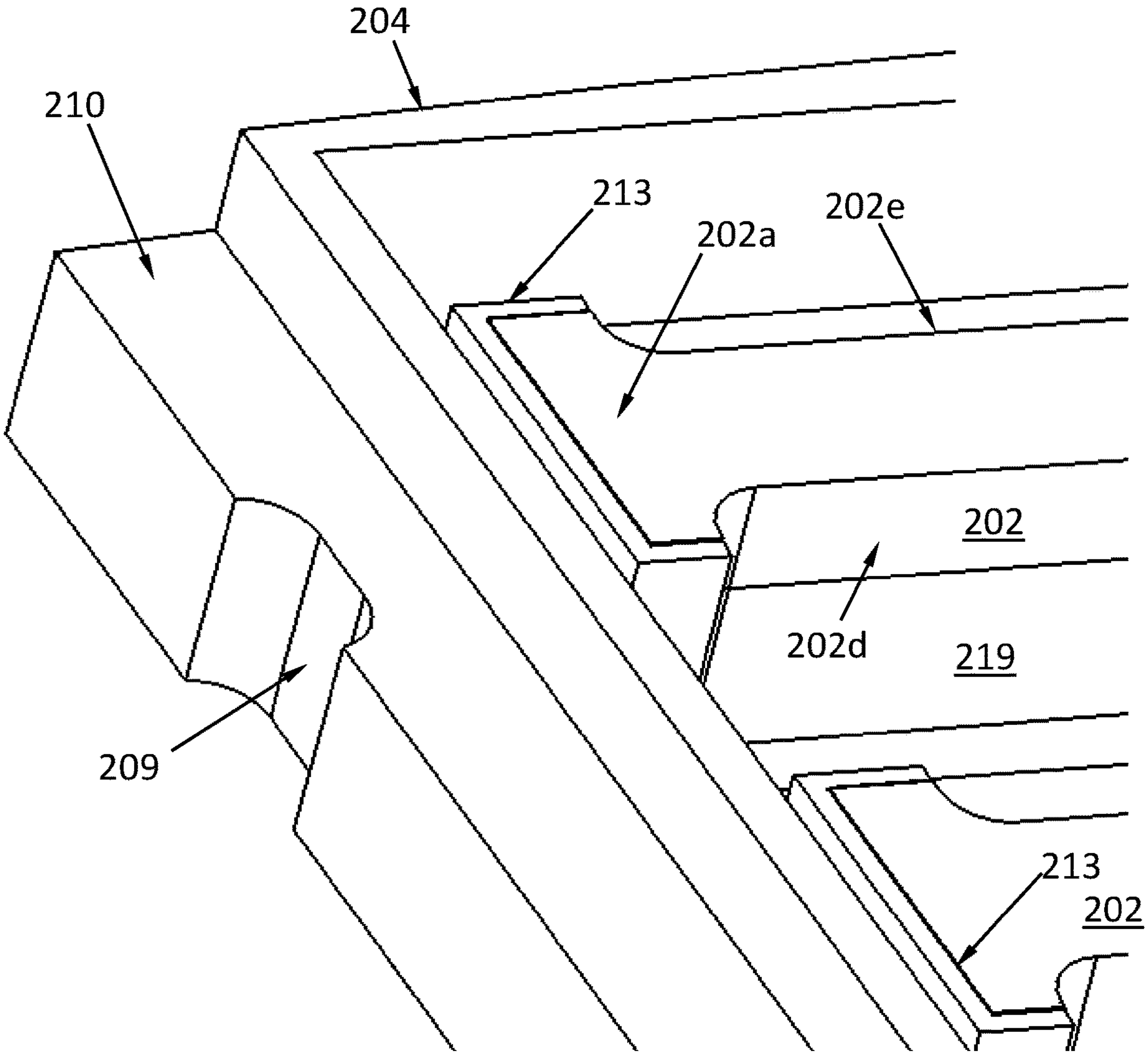
FIG. 15 shows a close up of a corner portion of base 204, more clearly illustrating how resilient buffers 213 may extend around portions of floating screening bars 202. For clarity, FIG. 15 omits the holding frames 201 shown in FIGS. 6-10.

The baseplate 207 may be shaped so as to be complimentary with base 204, and thus, it may have an outer peripheral shape or profile that matches or approximates an outer peripheral shape or profile of base 204 as depicted. The baseplate 207 may comprise one or more large pass-through apertures 215 as shown. Each large pass-through aperture 215 may extend across an area of the baseplate 207 beneath/under floating screen bars 202. An edge portion of the large pass-through apertures 215 may optionally serve to support first 202*a* and/or second 202*b* ends of screening bars 202. In such embodiments, a width of a large pass-through aperture 215 may be sized so as to be less than an overall length of one or more floating screen bars 202 extending between ends 202*a*, 202*b*. In some embodiments, as depicted in FIG. 15, a screen bar support 219 portion of base 204 may support a screen bar 202, without limitation.

The base 204 of the dynamic variable opening discharge grate 200 may comprise a polymer, such as hard polyurethane. The base 204 may be formed in a mold, e.g., by virtue of over-moulding one or more of the other components within the dynamic variable opening discharge grate 200. A peripheral portion of the base 204 may comprise one or more mounting hole portions 209. Each mounting hole portion 209 may be formed within a portion of a recessed support lip 210. Recessed support lips 210 may extend outwardly along opposing side portions of base 204 as shown. When placed adjacent to the recessed support lip 210 of an adjacent base 204 of another dynamic variable opening discharge grate 200, a structure similar to channel 211 may be formed between adjacent dynamic variable opening discharge grates 200. A lifter 203, such as the one depicted in FIG. 13 may be received by a channel (similar to channel 11) formed by two adjacent recessed support lips 210. The mounting hole portions 209 may, align with mounting holes within channel 211 so that a lifter 203 may be equally placed within channel 211 or received by a channel formed by two adjacent recessed support lips 210. Fasteners (not shown) may extend through mounting hole portions 209 to connect a lifter 203 to a mount 7 and secure two adjacent bases 204 to the mount 7.

A portion of the base 204 may comprise a resilient buffer 213. The resilient buffer 213 may comprise a soft rubber, elastomeric material, or other polymer which is designed to elastically, rather than plastically deform. The entire base 204 may be formed of the same material as resilient buffer 213, or the resilient buffer 213 may be formed of a softer or lower durometer polymer than a polymer used for other portions of base 204, without limitation. Portions of floating screen bars 202 may be over-moulded with resilient buffer 213.

During operation, as undersized media 4 within a mill 1 impacts between two adjacent floating screen bars 202, the resilient buffer 213 may be configured to allow the two adjacent floating screen bars 202 to temporarily separate from one another, thus providing a dynamic (i.e., expanding/contracting) variable sieve opening 206 between adjacent floating screen bars 202.

Upon temporary expansion of the dynamic variable sieve opening 206, the undersized media 4 may be allowed to pass through the dynamic variable opening discharge grate 200 and into the discharge chute 8; or, the undersized media 4 may be allowed to return to the mill 1 without permanently lodging itself between floating screen bars 202. Accordingly, resilient buffer 213 may be adequately configured to absorb kinetic energy and impact shocks caused by media 4, thus mitigating the potential for pegging/spot welding of undersized media 4 within openings 206 which is known to occur with conventional discharge grates 2.

In this specification, adjectives such as first and second, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

LIST OF REFERENCE IDENTIFIERS

1 Mill (e.g., ball mill, SAG mill, rod mill, rotating mill for comminuting ore)
2 Conventional discharge grate (prior art)
3 Mill discharge end
4 Grinding media
5 Pulverized material
6 Fixed sieve opening
7 Mount
8 Discharge chute
9 Conventional lifter bar (prior art)
200 Dynamic variable opening discharge grate
201 Holding frame
202 Floating screen bar
**202*a*** First end of floating screen bar
**202*b*** Second end of floating screen bar
**202*c*** Middle portion of floating screen bar
**202*d*** First cutout
**202*e*** Second cutout
**202*f*** Third cutout
**202*g*** Fourth cutout
203 Lifter

204 Base
205 Transverse securing bar
206 Dynamic (i.e., expanding/contracting) variable sieve opening
207 Baseplate
208 Baseplate mounting hole
209 Mounting hole portion
210 Recessed support lip
211 Channel
212 Side support
213 Resilient buffer
214 Receiving opening
**214*a*** First end of receiving opening
**214*b*** Second end of receiving opening
**214*c*** Middle portion of receiving opening
**214*d*** First cutout
**214*e*** Second cutout
**214*f*** Third cutout
**214*g*** Fourth cutout
215 Large pass-through aperture
216 Fastening bore
217 Lifting feature (e.g., hook eye)
218 Protrusion
219 Screen bar support

What is claimed is:

1. A discharge grate (200) for an internal discharge end (3) of a mill (1), the discharge grate (200) comprising:
open surface area for passing pulverized material (5) from an inside of the mill (1) to a discharge chute (8), and
closed area for discouraging passage of grinding media (4) from the mill (1) and maintaining the grinding media (4) and unpulverized material within the mill (1),
wherein the discharge grate (200) further comprises:
at least one dynamic variable sieve opening (206) defined between two adjacent floating screen bars (202), and
a holding frame (201) for receiving the floating screen bars (202);
the floating screen bars (202) being configured to a least temporarily move with respect to one another and/or with respect to the holding frame (201).

2. The discharge grate (200) according to claim 1, further comprising an elastically deformable resilient member (213) between each of the floating screen bars (202) and the holding frame (201).

3. The discharge grate (200) according to claim 2, wherein the resilient member (213) comprises a polymeric material.

4. The discharge grate (200) according to claim 1, wherein the holding frame (201) comprises receiving openings (214) for receiving the floating screen bars (202), each of the receiving openings (214) being sized to be larger than each of the floating screening bars (202), and each of the receiving openings (214) is configured to receive a resilient member (213).

5. The discharge grate (200) according to claim 4, wherein each of the receiving openings (214) comprises a first cutout (**214*d*) and a second cutout (214*e*) positioned across from the first cutout (214*d***).

6. The discharge grate (200) according to claim 5, wherein each of the floating screen bars (202) comprise a first cutout (**202*d*) and a second cutout (202*e*) positioned opposite the first cutout (202*d*), wherein the at least one dynamic variable sieve opening (206) is defined between the first cutout (202*d*) of one of the floating screen bars (202) and the first cutout (214*d*) of one of the receiving openings (214**).

7. The discharge grate (200) according to claim 1, further comprising a lifter (203).

8. The discharge grate (200) according to claim 7, further comprising a channel (211) for receiving a protrusion (218) of the lifter (203).

9. The discharge grate (200) claim 1, further comprising at least one transverse securing bar (205) extending across the floating screen bars (202).

10. The discharge grate (200) according to claim 9, wherein the at least one transverse securing bar (205) is secured by two side supports (212).

11. The discharge grate (200) according to claim 1, further comprising a baseplate (207) backing a base portion (204).

12. The discharge grate (200) according to claim 11, wherein the baseplate (207) comprises a pass-through aperture (215) below the floating screen bars (202).

13. The discharge grate (200) according to claim 1, further comprising a recessed support lip (210) on opposing sides of a base portion (204) for supporting a lifter (203).

14. A method of securing the discharge grate to the internal discharge end (3) of the mill (1) suitable for comminuting ore, comprising:

providing the discharge grate (200) according to claim 1;

mounting the discharge grate (200) over a discharge chute (8) of the mill (1);

securing the discharge grate (200) to a mount (7) provided at the discharge end (3).

15. A method of comminuting the ore comprising:

providing the mill (1) suitable for comminuting the ore, the mill (1) having the discharge grate (200) according to claim 1, the discharge grate (200) provided to the internal discharge end (3) of the mill (1); the discharge grate (200) being secured to the mount (7) and extending over a discharge chute (8):

filling the mill (1) with media (4) and material to be pulverized;

operating the mill (1) by rotating a portion thereof containing the media (4) and material to be pulverized; and allowing the at least one dynamic variable sieve opening (206) to expand to allow pulverized material (5) and/or undersized media (4) or the media (4) to pass therethrough.

* * * * *